Nov. 12, 1929.                    O. WERNER                    1,735,149
                                 LIGHTING UNIT
                              Filed Oct. 20, 1927
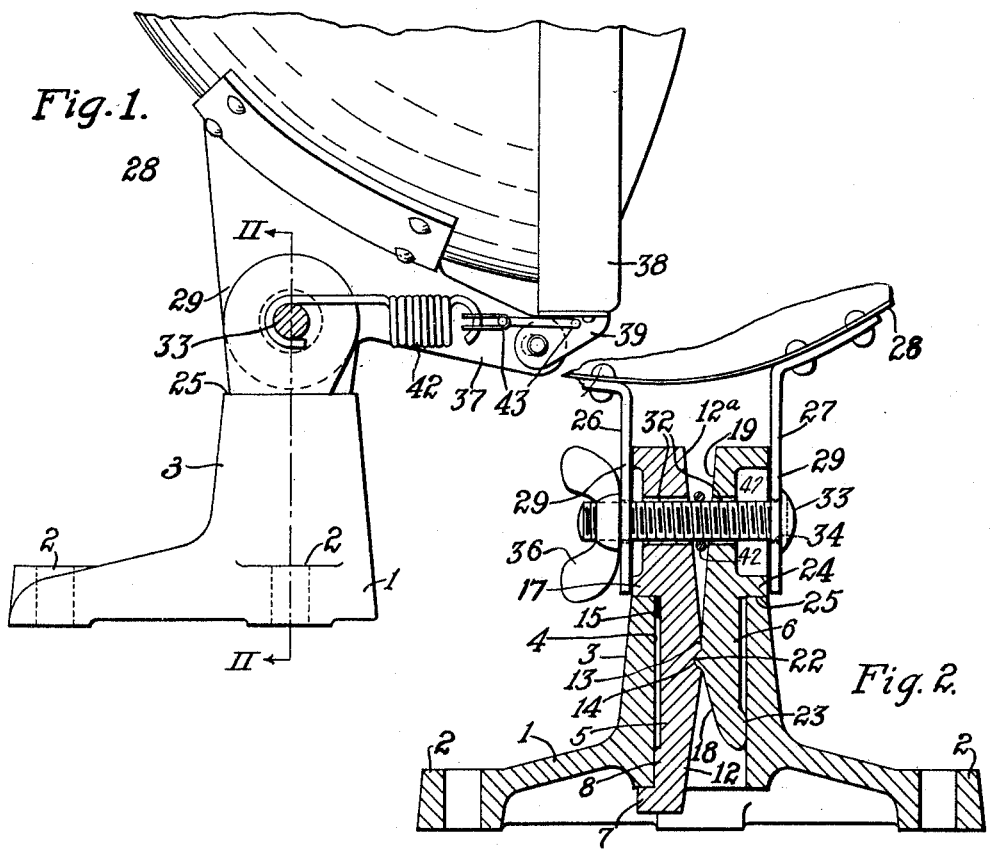
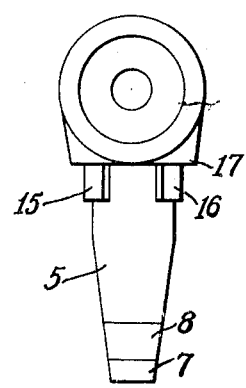
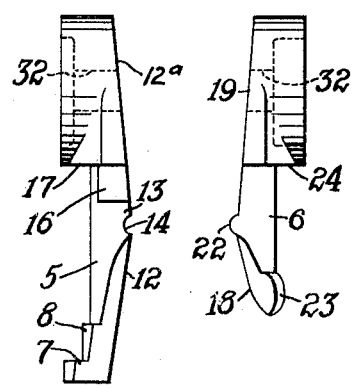
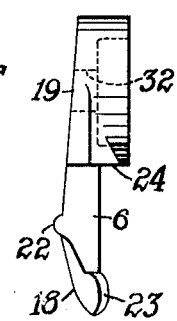
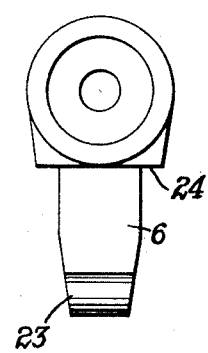
INVENTOR
Oscar Werner
BY
ATTORNEY Patented Nov. 12, 1929

1,735,149

UNITED STATES PATENT OFFICE

OSCAR WERNER, OF SOUTH BEND, INDIANA, ASSIGNOR TO WESTINGHOUSE ELECTRIC & MANUFACTURING COMPANY, A CORPORATION OF PENNSYLVANIA

LIGHTING UNIT

Application filed October 20, 1927. Serial No. 227,387.

My invention relates to lighting units and has particular relation to a universally adjustable bracket for lighting units, electric fans and the like.

An object of my invention is to provide a bracket which permits universal adjustment of the projector in any direction and which may be locked in position by means of only one locking device.

Another object of my invention is to provide a bracket which may readily be disengaged from the base member.

Another object of my invention is to provide a bracket which shall be simple, sturdy and inexpensive to manufacture.

Referring to the drawings in which like figures indicate like parts:

Figure 1 is a view, partly in section and partly in elevation, of my bracket showing a lighting projector mounted thereon.

Fig. 2 is a view, in section, showing the component parts of the bracket and base.

Fig. 3 and Fig. 4 are detail side and end views, respectively, of one of the wedge members of the bracket, and Fig. 5 and Fig. 6 are detail end and side views, respectively, of the other wedge member of the bracket.

Referring to Figs. 1 and 2, a base 1 is employed having drilled lug members 2 for fastening the base to a foundation (not shown) and a tubular standard 3. The engaging members of the bracket comprise a long wedge member 5 and a short wedge member 6.

The long wedge member 5 is provided with a shoulder 8, at its lower portion, and shoulders 15 and 16 at its upper portion to be forced against the inner surface 4 of the standard 3 to provide a three point contact which prevents relative motion between the wedges and the base. The long wedge member also has a flange 17 at its upper end and a flange 7 at its lower end to bear against the upper and lower ends, respectively, of standard 3 and to maintain member 5 in a vertical position. Flange 7 is of sufficient width to prevent disengagement from the end of standard 3, when both wedge members 5 and 6 are in place, even though they are not clamped tightly. The inner face of the wedge member 5 is beveled to form faces 12 and 12a that meet to form a high portion 13 approximately intermediate its ends and a horizontally extending groove 14 is provided in this high portion.

The short wedge member 6 does not project entirely through the standard 3 of the base member, but is provided with beveled faces 18 and 19 which, respectively correspond, and are opposite, to the faces 12 and 12a on the member 5. A rounded projection 22 is provided at the high point of the member 6 which engages the groove 14 in the member 5. The member 6 is provided with a rounded end shoulder 23 to engage the inner wall 4 of the standard 3 and has a flange 24 intermediate its ends to engage the upper surface 25 of the standard. The surface between shoulders 23 and 24 is inset sufficiently to permit insertion of the wedge member 6 to seat the projection 22 in the recess 14.

Two supporting plates 26 and 27, that are fastened to a projector housing 28, have drilled ear portions 29 to engage the outer surfaces of the respective wedge members 5 and 6. A bolt 33 passes through suitable openings 34 in the ears 29 and through suitable openings 32 in the wedge members 5 and 6, and a wing nut 36 is provided for tightening the plates against the wedge members.

Other portions 37 of the plates 26 and 27 constitute ear members which act as parts of a hinge for the cover 38. Two projections 39 on the cover engage the ears 37 and act as the moving portion of the hinge. The cover may be held against the projector housing by means of a spring 42 which is fastened to the bracket bolt 33 and to a suitable link 43 which, in turn, engages the door.

In operation, when the projector is to be assembled on the base, the wedge member 5 is inserted into the standard 3 of the base, and then wedged member 6 is inserted. The plates 26 and 27 carrying the projector 28 are then slid over the members 5 and 6 and the locking bolt 33 inserted.

When the desired position of the projector has been found, the wing nut 36 is tightened, thus clamping the plates 26 and 27 to the members 5 and 6 to hold the projector in fixed position with respect to the wedge members. The same tightening of the wing nut against the locking bolt causes the short wedge member 6 to rock on the pivot formed by the high points of the wedge members and causes the bearing surfaces of the two wedges to tightly engage the inner wall of the standard to prevent rotation.

My invention provides a universally adjustable bracket which may be locked against movement in all directions by tightening one bolt and which may easily be removed from the base. The parts are strong, may be readily cast and require little or no machining.

Although I have described a preferred embodiment of my invention, modifications may be made by those skilled in the art; for instance, the plate members may be adapted to fit between the wedge members. These and other modifications which may be made by workers in the art, may be made without departing from the spirit and scope of my invention, as defined in the appended claims.

I claim as my invention:

1. A bracket comprising a base having a tubular standard, an object to be supported, wedge members adapted to be inserted in said standard and means for actuating said wedge members from outside said standard to cause them to engage the inner wall of said standard to clamp said members to said base, said actuating means being adapted to detachably fasten said base to said wedge members, and supporting plates on the object adapted to pivotally engage said wedge members and be fastened thereto by the means utilized to actuate said wedge members.

2. A universal bracket comprising a base having a tubular standard and relatively long and short wedge members adapted to be inserted in said standard, said members having shoulders to engage the inner wall of the standard and bearing surfaces disposed between said shoulders on their opposite faces, a projection on the inner end of the long member for engaging the inner end of the tubular standard for holding the long and short members in the standard, even when loosely engaged and means at the outer ends of said long and short wedge members for drawing them together to force their inner ends against the inner wall of the standard, and supporting plates adapted to be detachably engaged to said means for drawing said wedge members together.

3. A bracket comprising a base having a tubular standard, wedge members pivoted intermediate their ends and adapted to be partly inserted in the tubular standard whereby clamping of the outer ends causes the inner ends to engage the standard, and an object to be supported having fixed supporting plates adapted to pivotally engage the outer portion of the wedges and a single clamping means for engaging the supporting plates to the outer ends of the wedges for clamping them together to cause the object to be supported to become detachably engaged to the base.

In testimony whereof, I have hereunto subscribed my name this fifth day of October, 1927.

OSCAR WERNER.